Patented Sept. 7, 1937

2,092,091

UNITED STATES PATENT OFFICE 2,092,091

ART OF COLORING FRUIT

Jagan N. Sharma, Berkeley, Calif., assignor to Food Machinery Corporation, San Jose, Calif., a corporation of Delaware No Drawing. Application September 22, 1934, Serial No. 745,100

11 Claims. (Cl. 99—103)

This invention relates to improved methods of imparting desired coloration to fruit provided with water-repellent and/or oily outer skins. The invention also relates to new and improved types of treating agents whereby a desired varietal color may be imparted to whole fruit provided with water-repellent or oily skins, such as citrus fruit.

The desirability of imparting a varietal color to fruit and one method of accomplishing this result is disclosed in my co-pending application Serial No. 712,831. As therein disclosed, the process may comprise the formation of a suitable colloidal solution of an oil-soluble dye in an aqueous medium containing surface tension reducing agents, the fruit being then brought into contact with such colloidal suspension and then rinsed or washed and finally dried, waxed, wrapped and packed. Some difficulty is experienced, however, in obtaining suitable water-insoluble and oil-soluble dyes and in forming colloidal suspensions of the same. It has been thought, heretofore, that inasmuch as the dye is to impregnate the oily, waxy and water-repellent skin of the fruit, an oil-soluble and water-insoluble dye was necessary. The present invention, however, is based upon the discovery that under certain conditions and by the use of amino dyes containing or including salts of the strong mineral acids, it is not necessary to use oil-soluble and water-insoluble dyes nor is it necessary to form colloidal suspensions of such oil-soluble dyes. Instead, the present process simplifies the prior procedure and permits the use of dyes which are water-soluble and normally oil-insoluble. I have discovered that such water-soluble dyes may be caused to penetrate and suitably color the skins of fruit even though such skins are oily, waxy and water-repellent.

This discovery is directly opposed to the teachings expressed in prior patents wherein it was definitely stated that by the use of water-soluble and oil-insoluble dyes in the treating bath a spotted effect would be produced. For example, O'Neill et al. in Patent No. 1,813,357 disclosed a method of segregating abraded, cut or bruised citrus fruit from perfect fruit by submitting all fruit to an aqueous bath of water-soluble dye, such dye affecting the cuts and bruises which have exposed the water-wetted internal structure of the fruit and not affecting the sound, oily, external skin of the fruit. In other words, these water-soluble dye solutions would only dye the cuts and bruises producing spotted fruit, which could then be readily segregated from the uncolored sound fruit. By the use of water-soluble dyes in accordance with my invention, the entire external surface of the fruit, that is, the oily, water-repellent surface, is caused to assume a desired varietal coloration, thereby accomplishing a result not accomplished by the O'Neill method.

The invention also relates to a suitable treating agent whereby a desired varietal coloration may be imparted to fruit of the character described hereinabove. In order to facilitate understanding of the invention, the materials, proportions and conditions of treatment relating to the adaptation of the invention to the citrus industry will be described in considerable detail.

Briefly stated, the treating agent for use in the method of the present invention is formed by adding a water-soluble and oil-insoluble amino dye containing and/or including a salt of an acid having a high dissociation constant in an aqueous medium such as water or water solution, the aqueous medium having a pH of 7 or more. Aqueous media having a pH of from 7 to about 9 are preferred. At no time should the pH be sufficiently high to cause coagulation and/or precipitation of the dye. The desired pH may be obtained by the use of alkali soaps or of alkalies such as sodium hydroxide, sodium carbonate, sodium silicate, potassium hydroxide, and the like. Distilled water may also be used but for commercial practice ordinary tap water with a small proportion of alkali is more suitable.

The amino dyes, as stated hereinabove, should include or contain salts of strong acids, preferably the mineral acids such as nitric, sulfuric and hydrochloric. The dyes used should be water-soluble and normally oil-insoluble. Examples of dyes which have been found suitable for use in imparting a desired varietal coloration to oranges include the following:

Bismarck brown (hydrochloride of benzine-meta-diazo-bis-meta-phenylene-diamine) having a structural formula as follows:

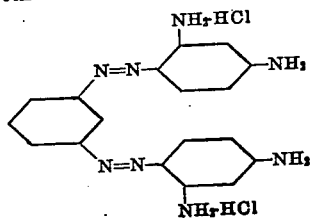

Bismarck brown R (which is a hydrochloride of toluene 2:4 diazo-bis-meta-toluene-diamine) having a structural formula as follows:

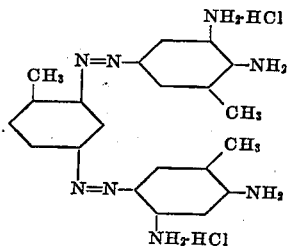

Acridine orange (which is a hydrochloride of tetra-methyl-diamino-acridine) which has the following structural formula:

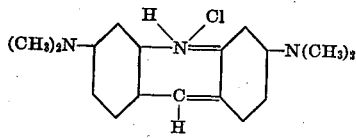

Instead of a hydrochloride, the dye may be a substitution product, such as a metal salt. For example, $ZnCl_2$ may be present instead of HCl. Iodides and bromides can also be used but hydrochlorides are usually most readily obtainable for use.

Auramine (which is a hydrochloride of tetramethyl-diamino-diphenyl-ketonamine) which would be represented as follows:

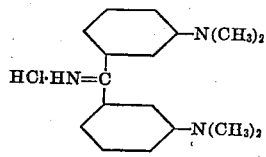

Phosphine, also known as chrysaniline, having a structural formula as follows:

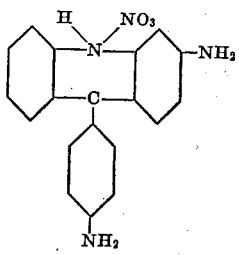

Other dyes suitable for use are:

Rhodamine 5G (dimethyl-diamino-dimethyl-ortho-chloro-phenyl-xanthenyl-chloride)
Brilliant Green C. I. 662 (sulphate)
Phosphine 3R C. I. 793 (nitrate)
Phosphine 2G C. I. 794 (nitrate)
Malachite Green C. I. 657 (zinc chloride salt)

In producing the desired treating agent, from ½% to 10% by weight of the bath may consist of the dye which readily dissolves in the medium. The hydrolysis takes place in water media, such hydrolysis resulting in the formation of dye compounds which have the property of penetrating or impregnating the skin of citrus fruits. By the use of these water-soluble dyes, concentrated aqueous solutions may be used so that the fruit-treating time is reduced. The oil-soluble and water-insoluble dyes used heretofore are only sparingly soluble even in mineral oils, distillates and the like and as a result, longer treating times had to be used. Even when fairly dilute solutions of the water-soluble amino dyes of the present invention are used, citrus fruits are suitably colored by contact with the treating agent for a period of not more than about five minutes at 110° F.

In imparting a desired varietal coloration to citrus fruit by means of the treating agent described hereinabove, the fruit are first preferably washed in the customary manner and then passed through a bath of the treating agent. After a suitable period of contact, the fruit are rinsed to remove excess or adhering treating agent and when desired, waxed and dried. It will be found that a substantially uniform, non-removable, varietal coloration will have been imparted to the fruit.

In view of the fact that water-soluble amino dyes are used, scars, cuts and stem ends of the fruit will likewise be colored. The coloration of the stems, cuts and scars may cause them to appear slightly darker than the remaining surface area of the fruit. In order to eliminate such darkening, the treating process may be modified as follows: The fruit may be washed, scrubbed or treated in the normal manner, dried and then waxed. After being waxed, the fruit may then be passed into a treating batch of the character described hereinabove in which water-soluble amino dyes, including salts of the strong mineral acids, are in solution. After being withdrawn from the bath, the fruit may be rinsed, dried and polished, or again waxed and polished. It will be found that a desired varietal coloration will thus be imparted to the fruit, the desired dye impregnating the first waxy coating applied and then passing into the skin of the fruit. The initial application of wax appears to protect the cuts, bruises and stems from excessive dye absorption.

Although the reason for the successful utilization of water-soluble dyes in accordance with this invention is not definitely known, it is believed that the water-soluble and oil-insoluble amino dyes of the character stated, when placed in solution in water or aqueous medium which is slightly alkaline or neutral, partly hydrolyze. It is believed that after such hydrolysis, the treating agent contains the original water-soluble amino dye in solution and products of hydrolysis in equilibrium with the solution or products of hydrolysis may be present in the form of an extremely fine colloidal suspension. These products of hydrolysis have the property of impregnating the oily skins of the fruit. As such products of hydrolysis are used up or withdrawn during treating of fruit with the treating solution, additional products are formed, equilibrium being maintained over a protracted period of time.

In the event the above reactions actually take place, it may be stated as a further qualification that the amino dye for use in the process of this invention should be of such character as to hydrolyze in alkaline or neutral media with the production of oil-soluble reaction products having a desired color-imparting property.

A still further modification of the process contemplates the formation of a solution of water-soluble (and oil-insoluble) amino dye containing a salt of a strong mineral acid in an aqueous medium of slight alkalinity, and also containing a solution of lighter colored dye, such as light yellow, water-soluble dye which does not hydrolyze to form oil-soluble reaction products, which secondary yellow dye need not belong to the group of amino dyes. Naphthol Yellow-S, Sunset Yellow FCF. and Tartrazine are illustrative of such lighter colored dyes. The resulting solution of the two types of dyes is then used in treating fruit. It will be found that the water-soluble amino dye containing salts of the mineral acids (which dye is generally of a darker shade or color than its products of hydrolysis) will be absorbed to some extent by the cut, bruised and abraded portions of the skin of the fruit but the darker color thus imparted to the cut, bruised and abraded areas of the skin will be counteracted by the light yellow dye similarly absorbed by such cut, abraded or bruised portions. As a result, the cut or bruised portions of the skin will not, at the end of the treatment, be of a considerably darker shade than the remaining perfect portions of the skin, the light yellow dye counteracting the effect of the darker water-soluble amino dye. The light yellow water-soluble dye, on the other hand, will not be absorbed by nor impregnate the perfect portions of the skin, thereby permitting the products of hydrolysis to suitably cover the perfect portions of the skin without a lightening in shade. The bruised or cut portions of the fruit absorb the darker water-soluble dye more quickly than the peel absorbs the products of hydrolysis but the lighter colored dye absorbed by the cuts or bruises simultaneously, imparts a more natural appearance to the cuts and bruises existing in the peel.

It has been stated hereinabove that the pH of the solution should not be sufficiently high to cause appreciable coagulation and/or precipitation of the dye or products of hydrolysis. In the event of pH of the solution is such that the products of hydrolysis are precipitated, attention is called to the fact that the precipitate will be in a very finely divided form and by the use of deflocculating agents such as soap, a colloidal suspension of the products of hydrolysis may be obtained, such colloidal suspension being capable of use for the purposes hereinabove referred to.

Having thus described my invention in several forms and modifications, those skilled in the art will appreciate and understand the applicability of the invention and of the treating agents, not only in accordance with the specific conditions set forth herein for illustrative purposes, but in other modifications and adaptations. All such changes and modifications as come within the scope of the appended claims are embraced thereby.

I claim:

1. A method of enhancing the natural color of whole citrus fruit which comprises adding a water-soluble and normally oil-insoluble amino dye containing a salt of an acid having a high dissociation constant to an aqueous medium having a pH of above 7, and then contacting whole fruit therewith.

2. A method of enhancing the natural color of whole citrus fruit provided with water-repellent surfaces which comprises adding a water-soluble and normally oil-insoluble amino dye containing a salt of a strong mineral acid to an aqueous medium having a pH of between 7 and 9, said amino dye being capable of hydrolyzing to form an oil-soluble reaction product, and contacting whole fruit therewith.

3. A method of enhancing the natural color of whole citrus fruit which comprises adding a water-soluble and normally oil-insoluble amino dye containing a salt of a strong mineral acid to an aqueous medium having a pH of between about 7 and 9, and contacting previously waxed whole fruit with the prepared aqueous medium.

4. A method of enhancing the varietal color of whole citrus fruit which comprises adding a water-soluble and normally oil-insoluble amino dye containing a hydrochloride to an aqueous medium having a pH of 7 to 9, contacting whole citrus fruit therewith for a sufficient length of time to cause the impregnation of the skin of such fruit with reaction products of said prepared medium to impart a desired varietal coloration to the fruit, and then removing excess of said prepared medium from the fruit.

5. A method of enhancing the varietal color of whole citrus fruit, which comprises adding a water-soluble and normally oil-insoluble amino dye from the group consisting of Bismarck brown, Bismarck brown R, acridine orange and auramine to an aqueous medium having a pH of 7 or more, the pH of said medium being not sufficiently high to cause precipitation of products of hydrolysis, contacting whole citrus fruit with such prepared medium, and then removing excess of such medium from the fruit.

6. In a method of enhancing the varietal color of whole citrus fruit, the steps of adding a water-soluble and normally oil-insoluble amino dye containing a salt of a strong mineral acid to an aqueous medium, also dissolving a water-soluble and oil-insoluble dye of light yellow color in said medium, contacting fruit with said medium whereby said first named amino dye will impregnate and color the water-repellent skin of the fruit and said last-named yellow dye will maintain cut and bruised portions of the skin at a desired shade of color.

7. In a method of enhancing the varietal color of whole citrus fruit, the steps of adding a water-soluble and normally oil-insoluble amino dye containing a salt of an acid having a high dissociation constant to an aqueous medium having a pH of 7 or more, also dissolving a water-soluble and oil-insoluble dye of a lighter color in said aqueous medium, and contacting whole fruit with the said medium.

8. In a method of enhancing the varietal color of whole citrus fruit provided with water-repellent surfaces, the steps of dissolving a water-soluble and normally oil-insoluble amino dye containing a negative radical of a strong acid having a high dissociation constant in an aqueous medium, and maintaining said aqueous medium at a pH above 7 but not sufficiently high to cause precipitation of products of hydrolysis, and contacting whole citrus fruit therewith for a time sufficient to enhance the varietal color of said citrus fruit.

9. A method of enhancing the varietal color of whole citrus fruit which comprises forming a thin waxy film on the external surfaces of whole citrus fruit, adding a water-soluble and normally oil-insoluble amino dye containing a salt of a strong mineral acid to an aqueous medium having a pH of between about 7 and 9 but not sufficiently high to cause precipitation of products of hydrolysis of said dye, and then contacting the previously waxed whole fruit with the prepared medium.

10. A method of enhancing the natural color of whole citrus fruit which comprises: adding a water-soluble and normally oil-insoluble amino dye containing a salt of a strong mineral acid to an aqueous medium having a pH of 7 and thereabove, the pH of said aqueous medium being insufficiently high to cause precipitation of products of hydrolysis of said dye, said amino dye being capable of hydrolyzing to form an oil-soluble reaction product, and contacting whole citrus fruit therewith for a period of time sufficient to impart a desired varietal coloration to the fruit.

11. In a method of enhancing the varietal color of whole citrus fruit, the steps of adding a water-soluble and normally oil-insoluble amino dye containing a salt of a strong mineral acid to an aqueous medium having a pH of 7 or more, said amino dye being capable of hydrolyzing to form an oil-soluble reaction product, the pH of said aqueous medium being insufficiently high to cause precipitation of products of hydrolysis of said dye, also dissolving a water-soluble and oil-insoluble dye of light yellow color in such aqueous medium, and contacting whole citrus fruit with such aqueous medium whereby said first named amino dye will impregnate and color the skin of the fruit and said last named yellow dye will maintain cut and bruised portions of the skin of the fruit at a desired shade of color.

JAGAN N. SHARMA.